United States Patent [19]

Morello et al.

[11] 4,215,545

[45] Aug. 5, 1980

[54] HYDRAULIC SYSTEM FOR TRANSMITTING POWER FROM AN INTERNAL COMBUSTION ENGINE TO THE WHEELS OF A MOTOR VEHICLE

[75] Inventors: Lorenzo Morello; Pier G. Castelli, both of Turin, Italy

[73] Assignee: Centro Ricerche Fiat S.p.A., Orbassano, Italy

[21] Appl. No.: 31,692

[22] Filed: Apr. 19, 1979

[30] Foreign Application Priority Data

Apr. 20, 1978 [IT] Italy ................ 67897 A/78

[51] Int. Cl.² ........................ F15B 1/02; F16H 39/46
[52] U.S. Cl. ...................... 60/413; 60/414; 60/437; 60/416
[58] Field of Search ............... 60/371, 413, 414, 416, 60/435, 436, 437, 438

[56] References Cited

U.S. PATENT DOCUMENTS

| | | | |
|---|---|---|---|
| 3,892,283 | 7/1975 | Johnson | 60/413 X |
| 4,019,404 | 4/1977 | Schauer | 60/437 X |
| 4,037,409 | 7/1977 | Leibach | 60/413 |

Primary Examiner—Edgar W. Geoghegan
Attorney, Agent, or Firm—Sughrue, Rothwell, Mion, Zinn and Macpeak

[57] ABSTRACT

A motor vehicle engine is arranged to drive the vehicle wheels through a mechanical transmission, an hydraulic system including a variable-output, reversible, hydraulic pump, a variable-output hydraulic motor usable reversibly as a pump and a two-speed gear box. The outlet and inlet of the pump are reversibly connected by delivery and return conduits respectively, through a distributor, to the inlet and outlet of the motor and an hydraulic accumulator is connected through a closable valve to the delivery conduit, the operation of the system being controlled by a microcomputer so that when the vehicle decelerates at a rate greater than that due to natural resistance, kinetic energy which is normally lost in the engine is stored in the accumulator and can subsequently be reused to drive the vehicle wheels, the engine being cut out or maintained at minimum power. Excess power from the engine may also be stored in the accumulator and the engine is connected to drive the wheels through a direct mechanical transmission at high speeds.

7 Claims, 1 Drawing Figure

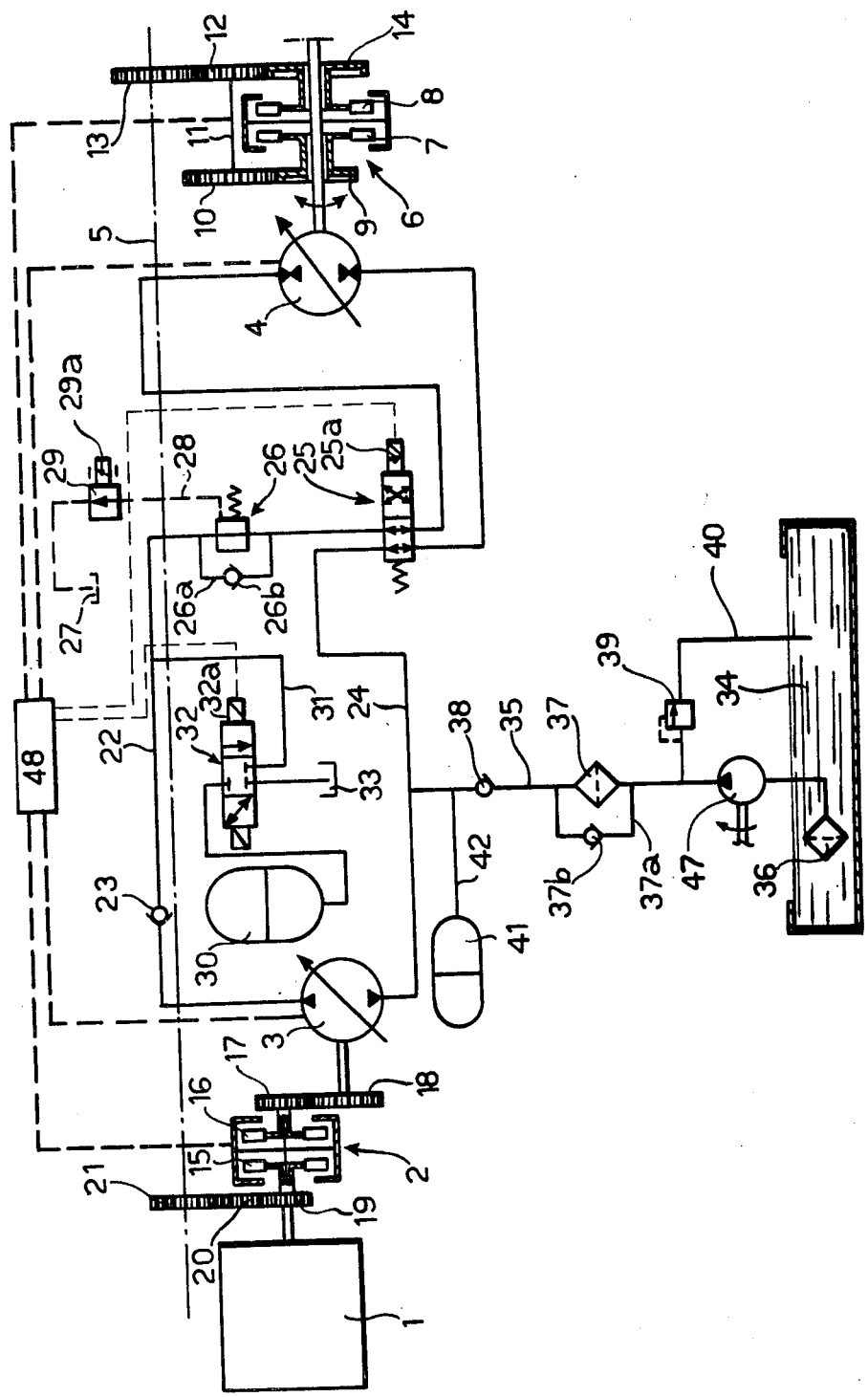

HYDRAULIC SYSTEM FOR TRANSMITTING POWER FROM AN INTERNAL COMBUSTION ENGINE TO THE WHEELS OF A MOTOR VEHICLE

BACKGROUND OF THE PRESENT INVENTION

The present invention relates to hydraulic systems for transmitting power from an internal combustion engine to the wheels of a motor vehicle, of the type having:
  a variable-output reversible hydraulic pump,
  a mechanical transmission between the internal combustion engine and the hydraulic pump,
  control means for varying the output of the hydraulic pump,
  a variable-output hydraulic motor designed to be used reversibly as a pump,
  a further mechanical transmission for connecting the hydraulic motor to the wheels of the vehicle.
  control means for varying the output of the hydraulic motor,
  a delivery conduit connecting the outlet of the hydraulic pump to the inlet of the hydraulic motor and
  a return conduit connecting the outlet of the hydraulic motor to the inlet of the hydraulic pump.

The hydraulic transmission may be of the hydrostatic or hydrodynamic type.

The object of the present invention is to provide an hydraulic transmission system for a motor vehicle of the type specified above which allows, at least some of the kinetic energy dissipated during deceleration of the vehicle to be recovered and re-used to power the subsequent rotation of the vehicle wheels so as to enable the internal combustion engine to operate almost constantly under its most efficient working conditions.

SUMMARY OF THE INVENTION

The present invention thus provides an hydraulic system for transmitting power from an internal combustion engine to the wheels of a motor vehicle as described above, further including:
  a two-position distributor located in the delivery and return conduits and arranged to form the delivery and return connections and reverse the said connections upon displacement between its two positions,
  an hydraulic accumulator, communicating with the delivery conduit for accumulating kinetic energy dissipated in the engine during deceleration of the vehicle,
  control means for the distributor for reversing the said connections during deceleration of the vehicle so that the hydraulic motor acts as a pump to deliver hydraulic fluid to the hydraulic accumulator,
  a friction clutch inserted in the said mechanical transmission between the internal combustion engine and the hydraulic pump, and
  control means for disengaging the friction clutch when energy accumulated in the said hydraulic accumulator is fed to the hydraulic engine.

In a preferred embodiment of the invention the delivery conduit includes a pressure-regulating valve between the connection to the hydraulic accumulator and the outlet of the hydraulic pump, and the hydraulic accumulator preferably communicates with the delivery conduit through a closable valve which may comprise a further distributor. Again, in the preferred embodiment, the return conduit communicates with a fluid reservoir through a conduit in which a pump, a filter and a non-return valve are connected in series, the pump being arranged to pump fluid from the reservoir into the return conduit and a valve being provided to return fluid fed by the pump to the reservoir when the pressure in the return conduit is greater than a prefixed value.

A second friction clutch is preferably provided in the mechanical transmission between the internal combustion engine and the hydraulic pump for connecting the internal combustion engine directly to the wheels of the vehicle, control means being provided for driving the engagement of the said second friction clutch when the speed of the engine exceeds a predetermined threshold value, and a mechanical gear box is preferably provided in the mechanical transmission between the hydraulic motor and the wheels of the vehicle.

One embodiment of the invention will now be more particularly described, by way of example, with reference to the accompanying drawing which is a purely diagrammatic plan view of an hydraulic transmission system according to the invention.

DESCRIPTION OF THE PREFERRED EMBODIMENT

Referring to the drawing, an internal combustion engine of a motor vehicle (not shown) is connected by means of a mechanical transmission generally indicated 2 to a variable-output, positive-displacement hydrostatic pump 3. The hydrostatic pump 3 may, for example, be of the axial-piston type in which case the variation in the output per revolution of the pump may be obtained by varying the inclination of the swash plate with which the pistons engage.

The mechanical transmission 2 includes two friction clutches 15, 16 so arranged that when the friction clutch 15 is disengaged and the clutch 16 is engaged, the internal combustion engine 1 is connected through a pair of meshed toothed wheels 17, 18 to drive the hydrostatic pump 3. When, however, the friction clutch 16 is disengaged and the friction clutch 15 is engaged, the engine 1 is connected through a trio of meshed toothed wheels 19, 20, 21 to rotate an output shaft 5 which drives the wheels (not shown) of the vehicle.

The output shaft 5 may also be driven by a two-speed ratio gear box 6 (shown on the right of the drawing) which is itself driven by a variable-delivery, positive-displacement hydrostatic motor 4. The motor 4 may also, for example, be of the axial-piston type.

The gear box 6 has two friction clutches 7, 8 arranged such that, when the friction clutch 7 is disengaged and the friction clutch 8 is engaged, the motor 4 rotates the output shaft 5 through a trio of meshed, toothed wheels, 12, 13, 14. When the clutch 7 is engaged, however, the motor 4 rotates the shaft 5 through a pair of meshed toothed wheels 9, 10, an intermediate shaft 11 and the meshed wheels 12, 13.

Referring again to the hydrostatic pump 3, the outlet from the pump is connected, by means of a delivery conduit 22 which includes a non-return valve 23, to the inlet of the hydrostatic motor 4 while a return conduit 24 connects the outlet of the hydrostatic motor 4 to the inlet of the hydrostatic pump 3. Each conduit 22, 24 is, in fact, connected through a common two-position, two-way hydraulic distributor 25 which can reverse the connections between the pump 3 and the motor 4. In the example illustrated the displacement of the hydraulic distributor 25 between its two positions is controlled by the excitation of a solenoid 25a but any other suitable control may be employed.

The conduit 22 also includes, between the non-return valve 23 and the distributor 25, a pressure-regulating valve 26 which allows part of the fluid flow through the conduit 22, in use, to be discharged through a conduit 28 into a reservoir 27; a further valve 29, controlled by the excitation of a solenoid 29a, is located in the conduit 28 to vary the discharge of fluid into the reservoir 27, and hence the fluid pressure in the conduit 22 downstream of the valve 26.

Between the valves 23, 26 a conduit 31 opens from the conduit 22 and can be connected to an hydraulic accumulator 30 through a three-position hydraulic distributor 32, controlled, in the example illustrated, by means of a solenoid 32a. When the hydraulic distributor 32 is in the position shown in the drawing, the connection between the hydraulic accumulator 30 and the conduit 22 is interrupted: displacement of the hydraulic distributor 32 into one of its other two positions places the hydraulic accumulator 30 in communication with a discharge reservoir 33 and the conduit 22 respectively.

A reservoir for the working fluid used in the hydraulic circuit illustrated is indicated 34 and communicates through a conduit 35 with the return conduit 24. The end of the conduit 35 which is immersed in the reservoir 34 is provided with a first filter 36 and in the conduit 35 there are inserted in series, an hydraulic pump 47, for feeding fluid from the reservoir 34 into the conduit 22, and controlled, for example, by an electric motor, a second filter 37, and a non-return valve 38. A further conduit 40, connected to the conduit 35 between the pump 47 and the filter 37 opens into the reservoir 34 and is provided with a regulating valve 39 for returning fluid fed by the hydraulic pump 47 back into the reservoir 34 when the pressure in the pipeline 24 is above a predetermined threshold value.

Both the filter 37 and the pressure regulating valve 26 are bypassed by conduits 37a, 26a respectively, in which non-return valves 37b, 26b are inserted. A low-pressure hydraulic accumulator 41 communicates with the conduit 35 downstream of the non-return valve 38 by means of a conduit 42.

OPERATION

The operation of the hydrostatic transmission system illustrated is as follows:

After use of the motor vehicle during which the hydraulic accumulator 30 has stored energy which it is now able to supply to provide driving power for the vehicle wheels, the hydraulic distributor 32 is actuated to take up its position in which the accumulator 30 is connected to the conduit 22, the friction clutches 15, 16 are disengaged and the internal combustion engine 1 may be cut out or maintained at minimum operating power. The fluid coming from the hydraulic accumulator 30 may thus flow into the conduit 22 and from there flows through the hydraulic distributor 25, which, in these conditions, is in the position illustrated in the drawing, to the hydrostatic motor 4 which, through the gear box 6, rotates the output shaft 5 connected to the wheels of the vehicle.

The regulation of the power supplied to the wheels is effected by regulating the output of the hydrostatic motor 4 per revolution. In addition, since the value of the "piston displacement" of the hydrostatic motor 4 may not fall below a minimum value, the pressure regulating valve 26 may be used to obtain further regulation of the power. The valve 26 is also particularly useful during the acceleration of the vehicle from rest.

The provision of the gear box 6 enables the lowest possible rotational speed of the hydrostatic motor 4 to be maintained for a given power transmitted to the output shaft 5, thus making it possible to use higher values of the "piston displacement" of the motor 4 for a given power with consequent increase in its efficiency.

While the conditions above prevail, it is possible to reverse the motor vehicle by reversing the connections between the pump 3 and the motor 4 by means of the hydraulic distributor 25, hence reversing the direction of rotation of the motor 4.

When the hydraulic accumulator 30 is no longer able to satisfy the demand for motive power, the engine 1 is started again, if it has been stopped, and the friction clutch 16 is engaged so as to connect the engine 1 to drive the hydrostatic pump 3. In these conditions the system operates as an hydrostatic transmission of known type: the variation in the output per revolution of the hydrostatic pump 3 is controlled so as to maintain the internal combustion engine 1 working under conditions of minimum specific consumption and depending on whether the power put into the hydraulic circuit by the engine 1 is greater or lesser than that required to drive the vehicle wheels, the hydraulic accumulator 30 stores the excess power or supplies the amount which is lacking, respectively.

The above operating conditions last until either the hydraulic accumulator 30 has reached a predetermined energy-storage level, or the speed of the vehicle has exceeded a maximum threshold value. In the first case the friction clutch 16 is then disengaged so that the engine 1 may, once again, be cut out or maintained at its minimum operating power. In the second case, the friction clutch 16 is disengaged but the friction clutch 15 is engaged to connect the engine 1 directly to the output shaft 5 and to the wheels of the vehicle.

The storage of kinetic energy in the accumulator 30, in fact, occurs every time the vehicle decelerates at a rate greater than the "natural" deceleration which occurs as a result of the natural resistence to movement of the vehicle. Under these conditions, the hydraulic distributor 25 is actuated to reverse the connections between the pump 3 and the motor 4; the hydrostatic motor 4 then operates as a pump to feed fluid under pressure through the conduits 22 and into the hydraulic accumulator 30, the hydraulic distributor 32 being in its position in which the accumulator 30 is connected to the conduit 22.

The braking torque acting on the wheels is regulated by varying the "piston displacement" of the hydrostatic motor 4.

When the hydraulic accumulator 30 has reached its maximum storage level, the distributor 32 is actuated to break the connection between the accumulator 30 and the conduit 22 and any further excess kinetic energy of the vehicle is transformed entirely into thermal energy in the mechanical brakes of the vehicle. This maximum storage level of the accumulator 30 is greater than the said predetermined storage level of the accumulator 30 at which the clutch 16 is disengaged, it being preferable to take advantage of the kinetic energy recovery phases of the vehicle to complete the filling of the hydraulic accumulator 30 up to the maximum value.

When, for safety reasons, it is necessary to empty the hydraulic accumulator 30, for example, when the vehicle is to remain stationary for a relatively long period of time, the hydraulic distributor 32 is actuated to connect the hydraulic accumulator 30 to the reservoir 33.

When, as a result of possible losses in the hydraulic circuit, the pressure in the return conduit 24 falls below a predetermined value, additional fluid is fed into the system from the reservoir 34 through the conduit 35 by means of the hydraulic pump 47.

When it is required to operate the system as a simple hydraulic transmission, the hydraulic distributor 32 is actuated to take up its position in which the connection between the hydraulic accumulator 30 and the pipeline 22 is broken.

The regulation of the system illustrated may be carried out automatically by means of a microcomputer which processes signals indicative of the demands of the driver and of the prevailing operating conditions, and provides control signals for actuating the various components of the system. For clarity of illustration, only some of the control connections between the microcomputor 48 and the components of the system controlled thereby are shown.

Although the transmission system described is of the hydrostatic type, a transmission system of the hydrodynamic type may alternatively be used.

What is claimed is:

1. In an hydraulic system for transmitting power from an internal combustion engine to the wheels of a motor vehicle having:
    a variable-output, reversible hydraulic pump,
    a first mechanical transmission for connecting said internal combustion engine to said hydraulic pump,
    control means for varying said output of said hydraulic pump,
    a variable-output hydraulic motor designed to be used reversibly as a pump,
    a second mechanical transmission for connecting said hydraulic motor to the wheels of said vehicle,
    control means for varying said output of said hydraulic motor,
    a delivery conduit having respective connections to the outlet of said hydraulic pump and to the inlet of said hydraulic motor, and
    a return conduit having respective connections to the outlet of said hydraulic motor and to the inlet of said hydraulic pump,
    improvements in said hydraulic system including:
    a two-position distributor, said delivery and return conduits each being formed in two sections, the delivery conduit sections and the return conduit sections being interconnected through the distributor and the distributor being arranged to reverse the connections to interconnect the delivery conduit sections with respective said return conduit sections,
    a duct, having a connection to said delivery conduit,
    an hydraulic accumulator, having a connection to said duct for accumulating kinetic energy normally dissipated in the engine during deceleration of said vehicle,
    control means for said hydraulic distributor for reversing the said connections during deceleration of the vehicle so that the hydraulic motor acts as a pump to deliver hydraulic fluid to the hydraulic accumulator,
    a first friction clutch inserted in said first mechanical transmission, and
    control means for disengaging said first friction clutch when energy accumulated in said hydraulic accumulator is fed to said hydraulic motor.

2. In an hydraulic system as in claim 1, said improvements further including a pressure-regulating valve in said delivery conduit between said connection to said duct and said connection to the outlet of said hydraulic pump.

3. In an hydraulic system as in claim 1, said improvements further including a closable valve provided in said duct.

4. In an hydraulic system as in claim 1, said improvements further including:
    a fluid reservoir,
    a further conduit defining an opening at one end communicating with said fluid reservoir and having a connection at its opposite end to said return conduit,
    an auxiliary pump, a filter and a non-return valve connected in series in said further conduit, said auxiliary pump being arranged to pump fluid from said reservoir into said return conduit, and
    a valve for returning fluid fed by said auxiliary pump to said reservoir when the pressure in said return conduit is greater than a prefixed value.

5. In an hydraulic system as in claim 4, said improvements further including a low pressure hydraulic accumulator having a connection to said further conduit downstream of said non-return valve.

6. In an hydraulic system as in claim 1, said improvements further including,
    a second friction clutch in said first mechanical transmission for connecting said internal combustion engine directly to the wheels of the vehicle and
    control means for controlling the engagement of said second friction clutch when the speed of said engine exceeds a predetermined threshold value.

7. In an hydraulic system, as in claim 1, said improvements further including a mechanical gear box having two speed ratios in said second mechanical transmission.

* * * * *